(No Model.)
C. DE ROSSETTI.
WHEEL FOR VELOCIPEDES.
No. 568,281. Patented Sept. 22, 1896.
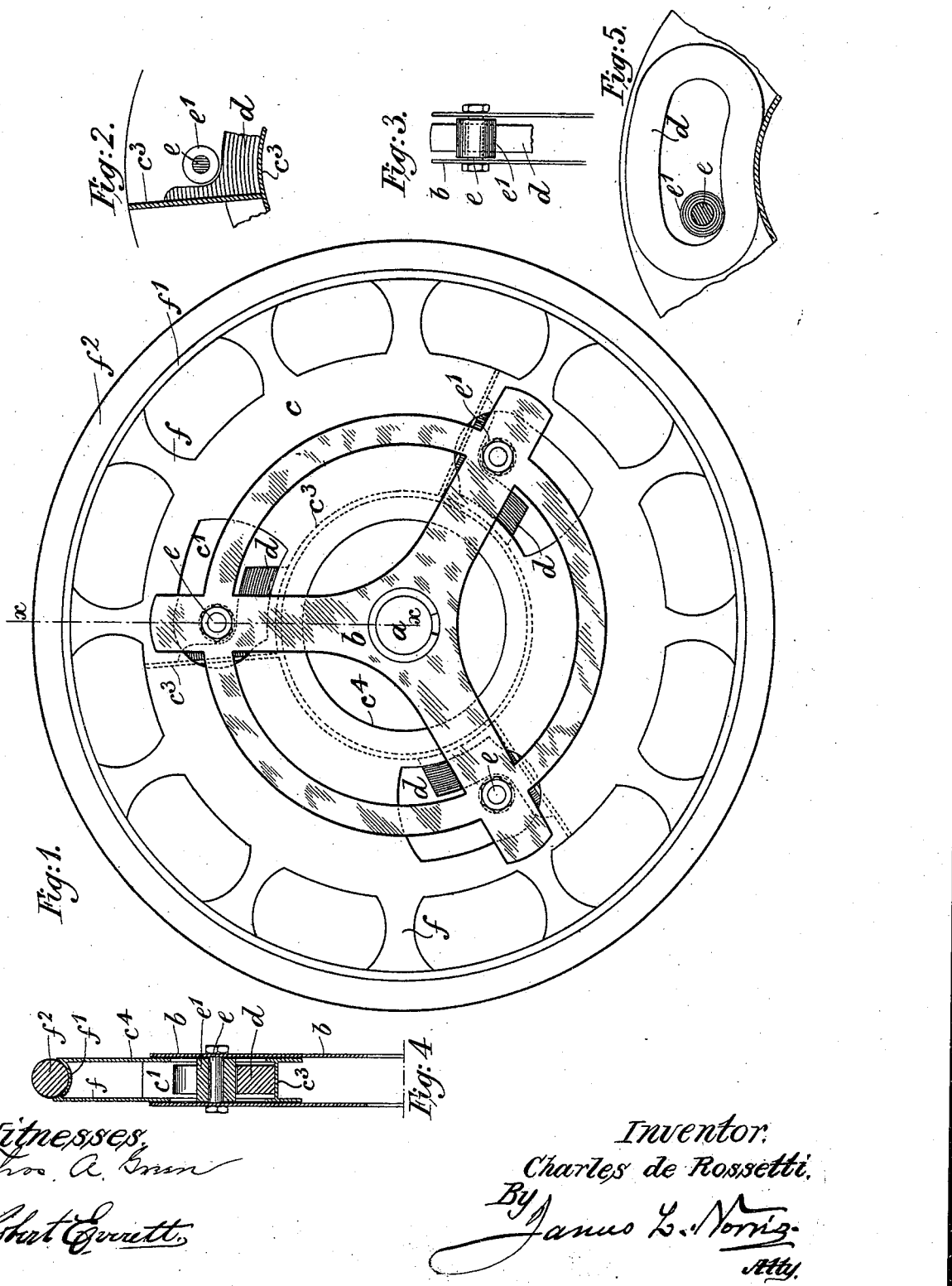
Witnesses:
Thos. A. Ginn
Robert Everett
Inventor:
Charles de Rossetti.
By James L. Norris
Atty.

UNITED STATES PATENT OFFICE.

CHARLES DE ROSSETTI, OF LONDON, ENGLAND.

WHEEL FOR VELOCIPEDES.

SPECIFICATION forming part of Letters Patent No. 568,281, dated September 22, 1896.

Application filed September 21, 1895. Serial No. 563,185. (No model.)

*To all whom it may concern:*

Be it known that I, COUNT CHARLES DE ROSSETTI, civil engineer, a subject of the King of Italy, residing at 100 Cambridge Street, Warwick Square, London, in the county of London, England, have invented certain new and useful Improvements in Wheels for Velocipedes and in Like Wheels, of which the following is a specification.

These improvements are designed to produce a wheel elastic in its operation to absorb and neutralize effects of concussions.

The main features of the improved wheel are a larger diameter annulus and a lesser diameter double frame supporting the axle, the annulus and frame being connected together by elastic cushionings, with various intermediary parts to facilitate and control the operation of the members of the combination. The axle of the driving-wheel has secured upon it by suitable screw connections the hub and two side plates, forming the lesser diameter portion of the wheel. Inner spokes from the axle have secured across from each one to the other of a pair a stud or rod, which stud forms a support for the loop or connection between it and a corresponding stud, one of a series, on and connecting the sides of the outer-part wheel. This outer-part wheel is formed of two side plates, preferably open-worked for lightness and connected by suitably-shaped cross-plating, forming boxes in which are located the spring connections. These side plates are laced to the rim, carrying the tire by usual spokes. Around the studs supporting the spring connections from the lesser frame the side plates of the larger-part wheel are pierced so as to give free play to studs in the elastic relative movements of the parts. The blocks or loops of india-rubber thus form elastic links or connections between the two portions of the wheel and admit of vertical movement of the one portion relatively to the other.

In the drawings, Figure 1 shows by side view a velocipede-wheel. Fig. 2 shows a front view of an elastic connection for the front wheel of a bicycle, partly in section. Fig. 3 shows an edge view of the same. Fig. 4 shows a sectional edge view taken on the line $x$ $x$, Fig. 1. Fig. 5 shows a front view of an elastic connection as best adapted for use with the driving-wheel.

The outer wheel, which carries the axle at $a$, is composed of two parts $b$ $b$, one part or half on each side of inner wheel or frame $c$. The frame $c$ is formed with boxes or spaces $c'$ to receive cushions of india-rubber or other suitable elastic material. The studs $e$ connect the sides $b$ $b$ of the outer wheel.

Cross-framing $c^3$ connects the sides $c^4$ of the frame $c$ together, and this cross-framing serves also to support tracks $d$, Figs. 2 and 3, and consequently the load on the axle, while in an outward direction the cushions, as shown in these figures, are not supported. The spokes $f$ connect the frame $c$ with the rim $f'$, carrying the tire $f^2$, which may be of ordinary or usual description.

The studs $e$, Figs. 2 and 3, have sleeves $c'$, of metal or like non-elastic material, which rest upon tracks $d$, somewhat in the form of letter L, of india-rubber or other elastic material, thus forming an elastic connection between the outer wheel $b$ $b$, which carries the rider, and the frame $c$, which is carried by the rim and tire $f^2$.

In the form of elastic connection adapted for use with the rear or driving wheel (see Fig. 5) I make the sleeve $e'$ of india-rubber or other elastic material and surround this sleeve with a track $d$ of rigid or non-resilient material.

I am aware that various constructions of wheels have been proposed wherein springs of various kinds have been applied between the ends and outer portions of wheels, between an inner-part wheel and an outer-part wheel in great variety, with the object of obtaining elasticity between the parts of the wheels and thereby preventing jar or vibration; but I make no claim, separately considered, to the application of elastic connections between the points of suspension of the load in my wheel; but, Having now particularly described and ascertained the nature of my said invention and in what manner the same is to be performed, I declare that what I claim is—

1. A wheel comprising an outer-part wheel having at suitable points oblong or elongated openings having in their interior tracks of limited extent, an outer-part wheel having radial arms, and rollers on said arms which have rolling contact with the tracks, substantially as described.

2. A wheel consisting mainly of two portions; an inner-part wheel, and an outer-part wheel the inner-part wheel carrying the axle and three armed supports for three rollers, the said rollers having each rolling contact with a track of limited area formed in the outer-part wheel and one of each pair of contact-surfaces being of rubber and the other of rigid material upon which is mounted a suitable rim and tire, as set forth.

In testimony whereof I, the said COUNT CHARLES DE ROSSETTI, have hereunto set my hand this 9th day of September, 1895.

CHARLES DE ROSSETTI.

Witnesses:
GEO. J. B. FRANKLIN,
WALTER J. SKERTEN.